United States Patent [19]

Tsuchida

[11] Patent Number: 5,610,975
[45] Date of Patent: Mar. 11, 1997

[54] VISUAL TELEPHONE APPARATUS

[75] Inventor: Shinji Tsuchida, Zama, Japan

[73] Assignee: Canon Kabushiki Kaisha, Tokyo, Japan

[21] Appl. No.: 276,507

[22] Filed: Jul. 18, 1994

Related U.S. Application Data

[63] Continuation of Ser. No. 973,532, Nov. 9, 1992, abandoned, which is a continuation of Ser. No. 679,134, Mar. 28, 1991, abandoned, which is a continuation of Ser. No. 396,647, Aug. 22, 1989, abandoned.

[30] Foreign Application Priority Data

Aug. 26, 1988 [JP] Japan .................................. 63-210657

[51] Int. Cl.$^6$ .............................................. H04M 11/00
[52] U.S. Cl. .............................. 379/100; 348/14; 348/16; 348/17; 379/102; 358/434
[58] Field of Search ................................. 348/14, 15, 16, 348/17, 18, 19; 379/100, 96, 97, 98, 94, 93, 102, 105, 104; 358/441, 400, 401, 434, 435, 436, 438, 442, 443

[56] References Cited

U.S. PATENT DOCUMENTS

| | | | |
|---|---|---|---|
| 4,280,143 | 7/1981 | Judd | 358/451 |
| 4,290,084 | 9/1981 | Minshull et al. | 358/451 |
| 4,485,400 | 11/1984 | Lemelson | 379/100 |
| 4,560,833 | 12/1985 | Weber et al. | 358/85 |
| 4,600,808 | 7/1986 | Cosentino et al. | 379/100 |
| 4,614,977 | 9/1986 | Kawahara et al. | 358/85 |
| 4,773,080 | 9/1988 | Nakajima | 379/100 |
| 4,800,439 | 1/1989 | Yoshina | 379/100 |
| 4,815,121 | 3/1989 | Yoshida | 379/100 |
| 4,823,376 | 4/1989 | Takahashi | 379/100 |
| 4,825,461 | 4/1989 | Kurita et al. | 379/100 |
| 4,888,795 | 12/1989 | Ando et al. | 379/53 |
| 4,953,196 | 8/1990 | Ishikawa et al. | 379/53 |
| 4,962,521 | 10/1990 | Komatsu et al. | 379/53 |
| 4,970,604 | 11/1990 | Coneignoux | 358/451 |
| 5,036,513 | 7/1991 | Greenblatt | 379/53 |
| 5,048,072 | 9/1991 | Yasuda | 379/83 |
| 5,202,670 | 4/1993 | Oha | 358/451 |

FOREIGN PATENT DOCUMENTS

| | | | |
|---|---|---|---|
| 0116296 | 8/1984 | European Pat. Off. | |
| 0254591 | 1/1988 | European Pat. Off. | |
| 0203063 | 10/1985 | Japan | 379/53 |

OTHER PUBLICATIONS

Nishino, Communication apparatus (UK Patent Application), Jul. 1989.

Translation of previously cited JA 0203063 (Nukada) Oct. 1985.

IEEE Global Telecommunications Conference, San Diego, CA, 28th Nov. 1st Dec. 1983, vol. 1 pp. 16.6.1–16.6.5; L. Chiariglione et al.: "A videoconference terminal with multipoint capability".

(List continued on next page.)

*Primary Examiner*—Curtis Kuntz
*Assistant Examiner*—Stella L. Woo
*Attorney, Agent, or Firm*—Fitzpatrcik, Cella, Harper & Scinto

[57] ABSTRACT

A visual telephone apparatus of the present invention is capable of deciding whether the apparatus of the other party of communication is a normal telephone apparatus or facsimile equipment by the operator who hears the data received from a connected communication medium or automatically by analysis of the procedure of controlling the communication with the apparatus of the other party, and transmitting the data obtained by photographing a subject in accordance with the communication specification corresponding to the apparatus decided, as well as receiving the data from the apparatus of the other party in accordance with the communication specification corresponding to the apparatus decided and displaying the data on a display unit. The apparatus is also capable of visual telephone communication with a visual telephone set and facsimile communication with facsimile terminal equipment.

19 Claims, 17 Drawing Sheets

OTHER PUBLICATIONS

"Picture Phone Cuts Time And Cost In Teleconferencing"; Electronics; vol. 58, No. 33, Aug. 1985, New York; pp. 34–36.

"Videoconferencing"; Spinivasan et al. Proceedings Tencon–1987 IEEE Region 10 Conference; vol. 2, Aug. 25, 1987, Seoul, Korea pp. 398–407.

"Communications Experiments: New Applications to Satellite Communications" by H. Takahashi et al; IEEE Transactions on Aerospace and Electronic Systems; vol. AES–22, No. 3, May 1986; New York. pp. 291–301.

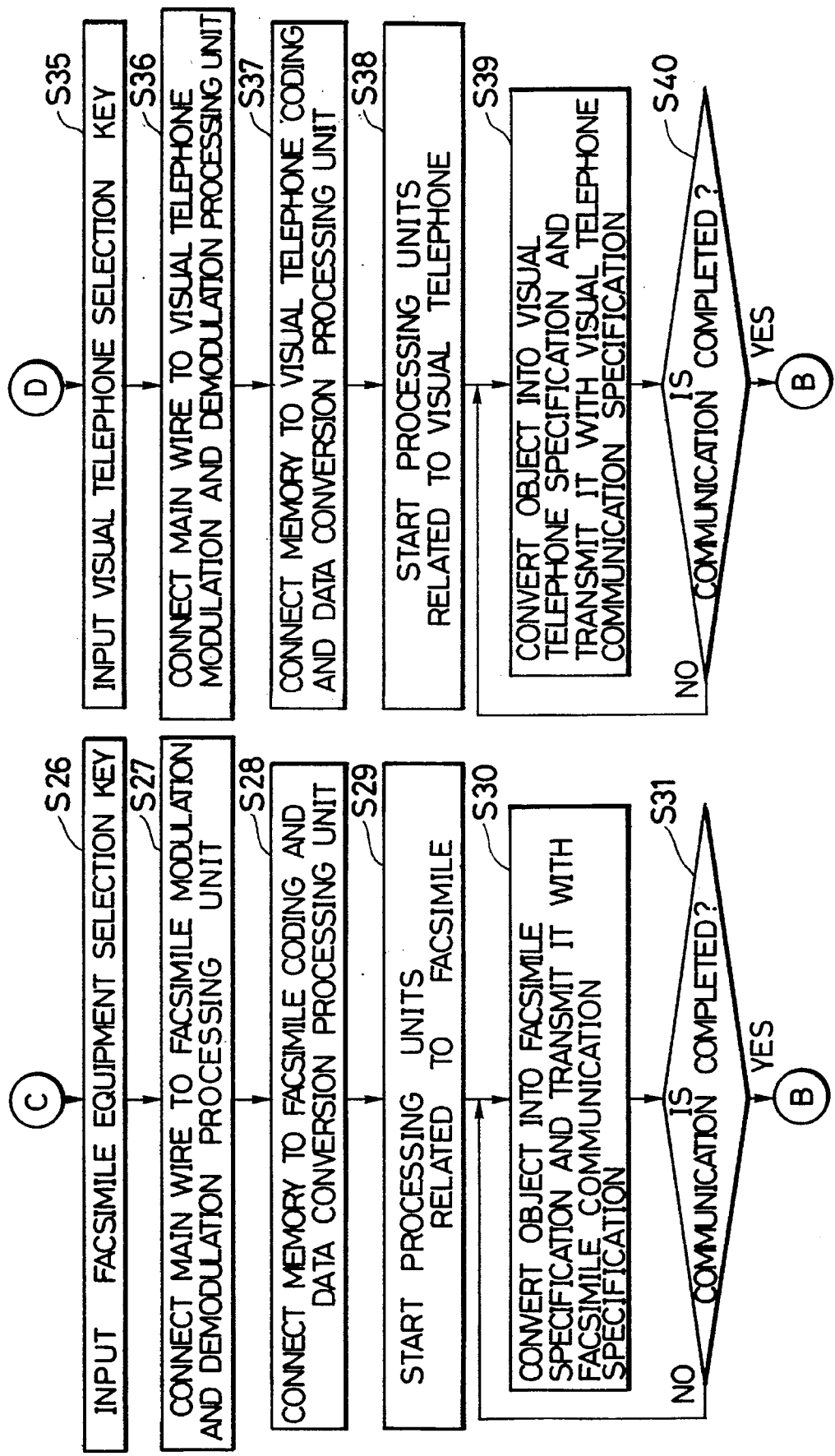

VISUAL TELEPHONE APPARATUS

This application is a continuation of application Ser. No. 07/973,532 filed Nov. 9, 1992, now abandoned, which is a continuation of application Ser. No. 07/679,134 filed Mar. 28, 1991, abandoned, which is a continuation of application Ser. No. 07/396,647 filed Aug. 22, 1989, abandoned.

BACKGROUND OF THE INVENTION 1. (Field of the Invention)

The present invention relates to a visual telephone apparatus which is capable of facsimile communication with facsimile terminal equipment.

2. (Related Art)

In conventional visual telephone apparatuses connected to public telephone circuits, it is possible to transmit and receive photographic images as long as the apparatus of persons at the other end of the line is provided with the same modulator and demodulator and the same protocol as one's own apparatus is provided with.

However, visual telephone apparatuses of the type widely used now have specifications which are different from those of facsimile terminal equipment and involve a problem in that it is impossible to transmit and receive images between such visual telephone apparatuses and facsimile equipment in spite of the similarity of photographic images to be transmitted and received between them.

SUMMARY OF THE INVENTION

The present invention has been achieved with a view to resolving the above-mentioned problem, and it is an object of the present invention to provide a visual telephone apparatus which is capable of facsimile communication with facsimile terminal equipment.

It is another object of the present invention to provide a visual telephone apparatus which is capable of facsimile communication with facsimile terminal equipment by deciding whether a communication specification for telephone communication or for facsimile communication is used and performing data communication using the communication specification in accordance with the decision.

It is a further object of the present invention to provide a visual telephone apparatus which is capable of facsimile communication with facsimile terminal equipment by deciding on a control procedure of communication from a connected communication medium in order to select one of telephone communication and facsimile communication and by performing data communication using the communication specification selected.

One method of resolving the above-described problem has the following arrangement:

The method comprises decision means for deciding whether the specification of communication with a connected communication medium is adapted for telephone communication or facsimile communication, photographic means for photographing an object to be transmitted during transmission, first conversion means for converting the object to be transmitted which is photographed by the photographic means into transmitting data having the specification in accordance with the communication specification decided by the decision means, sending means for modulating the transmitting data converted by the first conversion means and sending the data to the connected communication medium in accordance with the communication specification, demodulation means for receiving the data from the connected communication medium in accordance with the communication specification decided by the decision means and demodulating the data, second conversion means for converting the received data demodulated by the demodulation means into received data having a given specification and display means for displaying the received data converted by the second conversion means.

Such an arrangement enables the provision of a visual telephone apparatus which is capable of communication with either other visual telephone apparatus or facsimile terminal equipment.

BRIEF DESCRIPTION OF THE DRAWINGS

FIGS. 3A to 3F are flowcharts of the communication control of this embodiment;

DETAILED DESCRIPTION OF THE INVENTION

An embodiment of the present invention will be described in detail below with reference to the drawings.

Figure 1:
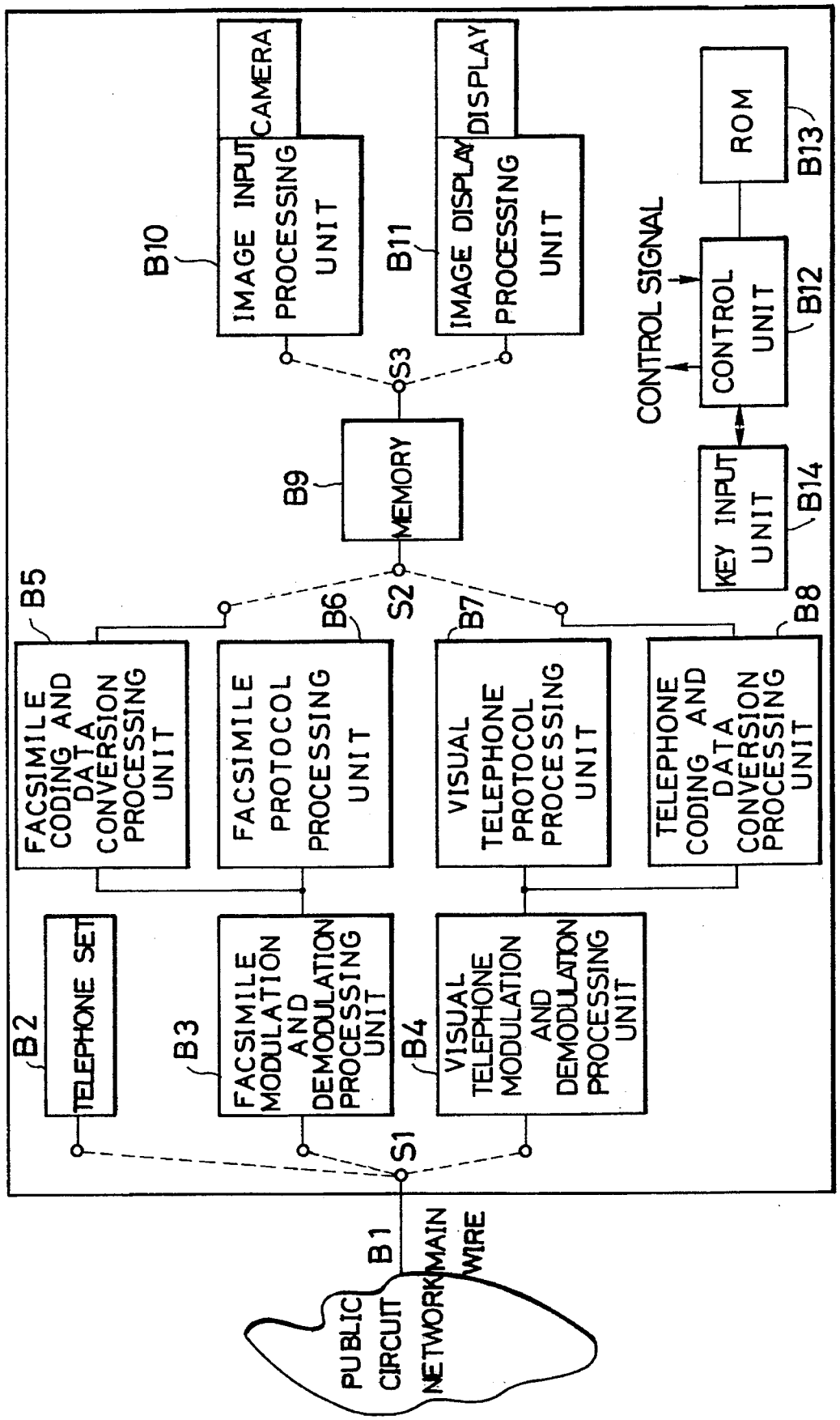
FIG. 1 is a block diagram of a visual telephone apparatus in an embodiment of the present invention.

FIG. 1 is a block diagram of a visual telephone apparatus in an embodiment of the present invention. In the drawing, reference numeral B1 denotes a main wire which serves as a communication medium connected to the apparatus of this embodiment and which is connected to a public transmission circuit network; reference numeral B2, a telephone set provided with the function of a known telephone set; reference numeral B3, a facsimile modulating and demodulating transmitted and received data in accordance with a facsimile communication specification; and reference numeral B4, a visual telephone modulation and demodulation processing unit for modulating and demodulating transmitted and received data in accordance with a visual telephone specification. Since the telephone set B2 and the two modulation and demodulation processing units B3, B4 each have a general configuration which is already known, they are not described below.

Reference numeral B5 denotes a facsimile coding and data conversion processing unit for converting received data from the facsimile modulation and demodulation processing unit B3 into display data in an image display processing unit B11 and for coding the display data in the image display processing unit B11 into transmit data for facsimile communication. Reference numeral B6 denotes a facsimile protocol processing unit for controlling communication with facsimile terminal equipment in accordance with the procedure for communication control with a facsimile communication specification. Reference numeral B7 denotes a visual telephone protocol processing unit for controlling communication with a visual telephone apparatus in accordance with a procedure of communication control with a visual telephone communication specification. Reference numeral B8 denotes a visual telephone coding and data conversion processing unit for converting the received data from the visual telephone modulation and demodulation processing unit B4 into display data in the image display processing unit B11 and for coding the display data in the image display processing unit B11 into transmit data for visual telephone communication. Reference numeral B9 denotes a memory in which data received from the facsimile coding and data conversion processing unit B5 and the visual telephone coding and data conversion processing unit B8 are temporarily stored. Reference numeral B10 denotes an image input processing unit for photographing a subject to be transmitted, converting it into digital data in a given format and outputting the data, and reference numeral B11 denotes an image display processing unit for outputting and displaying image information in the memory B9. Reference numeral B12 denotes a control unit for controlling the whole of this embodiment, e.g., switching control, in accordance with the program shown in FIG. 3 described below which is stored in ROM B13; reference numeral B13, ROM in which parameters and so on other than the above-described program, which are used in this embodiment, are stored; and reference numeral B14, a key input unit for inputting the telephone number of a called party, various types of control and so forth.

Reference numeral S1 denotes a change-over switch for connecting the main wire B1 to one of the telephone set B2, the facsimile modulation and demodulation processing unit B3 and the visual telephone modulation and demodulation processing unit B4; reference numeral S2, a change-over switch for connecting the memory B9 to one of the facsimile coding and data conversion processing unit B5 and the visual telephone coding and data conversion processing unit B8; and reference numeral S3, a change-over switch for connecting the memory B9 to the image input processing unit B10 and the image display processing unit B11.

Figure 2:
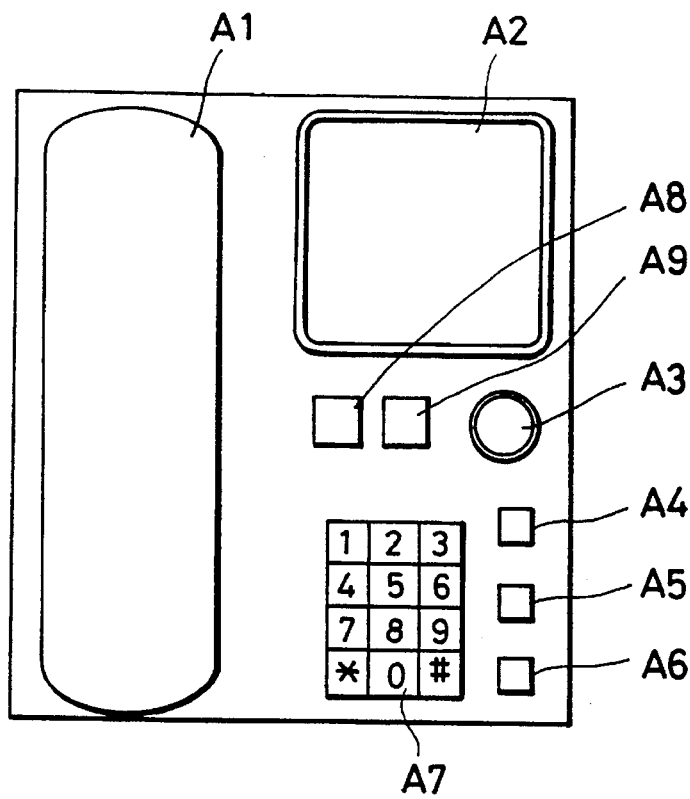
FIG. 2 is a drawing of the appearance of the visual telephone apparatus of this embodiment.

FIG. 2 shows the appearance of a visual telephone set of this embodiment having the above-mentioned configuration.

In the drawing, reference numeral A1 denotes a handset; reference numeral A2, a display provided in the image display processing unit B11 shown in FIG. 1; reference numeral A3, a camera provided in the image input processing unit B10 shown in FIG. 1 for photographing a subject to be transmitted; and reference numerals A4 to A9 denote input keys in the key input unit B14 shown in FIG. 1, in which reference numeral A4 denotes a call selection key for instructing the apparatus to operate as a telephone set, reference numeral A5 denotes a visual telephone selection key for instructing the apparatus to operate as a visual telephone apparatus, reference numeral A6 denotes a facsimile equipment selection key for instructing the visual telephone apparatus to communicate with facsimile terminal equipment, reference numeral A7 denotes a telephone number key for inputting telephone numbers and the like, reference numeral A8 denotes a camera starting key for instructing the camera A3 to start photographing, and reference numeral A9 denotes a camera stopping key for instructing the camera A3 to stop photographing.

The communication control in the embodiment having the above-mentioned configuration is described below with reference to the flowcharts shown in FIGS. 3A to 3F.

In this embodiment, the apparatus of the person on the other end of the line is specified by inputting using the keys A4 to A6, and the controls for talking and communication with the apparatus on the other end of the line are operated by a communication control procedure in accordance with the input from those keys.

A description will be first made of the case in which the operator performs transmission processing.

In this case, since the result of the decision made in Step S1 is YES, which indicates transmission, the processing proceeds to Step S5 in which a decision is made as to whether or not transmission is performed by talking control using this apparatus as a telephone set. If the called party uses a normal telephone set or the like and if this apparatus is operated as a normal for inputting. When input is performed from that key, the processing in the control unit B12 proceeds to Step S7 and subsequent steps. In Step S7, the change-over switch S1 is first switched so that the main wire B1 is connected to the telephone set B2. The operation by the transmitter moves to Step S8 for a calling process. In Step S8, the calling party first hooks off the handset A1 so that a direct current loop is formed in the main wire, then confirms the dial tone from the main wire and then inputs the telephone number of the called party from the telephone number key for calling. When the other party answers, the processing advances to Steps S9 and S10 for the conversation.

In these steps, talking takes place between handsets A1, and, when the talking is completed, the processing proceeds to Step S11, in which the handset A1 is hooked on so that the main wire is opened, and then returns to Step S1 for the next processing.

On the other hand, if it is decided in Step S5 that the apparatus is not operated as a telephone set, the processing proceeds to Step S15, in which the transmitter pushes down the camera starting key A8, and then moves to the subsequent Step S16 in which a subject to be transmitted is photographed by the camera A3. The photographic image is displayed on the display A2 in Step S17. In Step S18, the transmitter therefore sees the image displayed on the display A2 and decides whether or not the image may be transmitted. When photographing is again performed, the processing returns to Steps S16 and S17, in which photographing is continued until a satisfactory image to be transmitted is displayed.

In Step S18, when the image displayed on the display A2 assumes a state satisfactory to be transmitted, the processing advances to Step S19 in, which the camera stopping key A9 is pushed down for input. In the control unit B12, when the camera stopping key A9 is pushed down, the processing proceeds to Step S20, in which the change-over switch S3 is switched so that the image input processing unit 10 is connected to the memory B9, whereby the subject photographed in the image input processing unit B10 is stored in the memory B9.

Since the preparation for transmission is completed at this time, the transmitter hooks off the handset A1 for the purpose of calling the other party in Step S21. In the control unit B12, the change-over switch S1 is switched so that the main wire B1 is connected to the telephone set B2. At this time, the telephone set B2 assumes an off-hook state wherein a direct current loop is formed in the main wire. The processing then proceeds to Step S23 for a calling process in which the dial tone from the main wire is confirmed by the telephone set, and then the telephone number of the other party is input from the telephone number key. The telephone set B2 outputs a telephone number signal (a dial pulse signal, a DTMF signal or the like) corresponding to the telephone number input to call up the other party specified by the telephone number. Then, the transmitter waits until the other party answers in Step S24, and, when the other party answers, the processing proceeds to Step S25, in which a decision is made as to whether or not the apparatus of the listener is facsimile terminal equipment. If the apparatus of the listener is facsimile terminal equipment, the processing proceeds to Step S26, while if the apparatus is a telephone set, the processing proceeds to Step S35.

The apparatus of the listener is specified by the following method:

When the other party answers, if a CED signal (a carrier tone indicating facsimile terminal equipment on the G3 standard which operates in an automatic terminating mode) is output from the telephone receiver, the apparatus of the other party is specified as facsimile terminal equipment on the G3 standard, while if a person answers, it is confirmed by talking with the other party that the apparatus of the other party is facsimile equipment or a telephone set. If no CED signal is output and no answer is given from the other party, it is decided that the apparatus of the other party is an automatic incoming visual telephone set.

When the transmitter decides in Step S25 that the apparatus of the other party is facsimile terminal equipment, the facsimile equipment selection key A6 is pushed down in Step S26. In the control unit B12 which detects the input from the facsimile equipment selection key A6, the switch S1 is switched so that the main wire B1 is connected to the facsimile modulation and demodulation processing unit B3. At the same time, in the facsimile modulation and demodulation processing unit 3, the direct current loop formed in the main wire B1 is controlled so as to remain closed. In Step S28, the change-over switch S2 is switched so that the memory B9 in which the image of the object to be transmitted is stored is connected to the facsimile coding and data conversion processing unit B5. In Step S29, the facsimile modulation and demodulation processing unit B3, the facsimile coding and data conversion processing unit B5 and the facsimile protocol processing unit B6 are actuated. Subsequently, in Step S30, a procedure signal is communicated with the facsimile of the other party in the facsimile protocol processing unit B6 so that negotiation with the facsimile equipment of the other party is performed. Then, the transmitting data in the memory B9 is read and subjected to a coding process in which the data is converted (thinning or adding a margin) into a copy size which can be transmitted to the facsimile equipment of the other party by the facsimile coding and data conversion processing unit B5. The transmitting data is then subjected to the required modulation processing in accordance with the specification of facsimile communication in the facsimile modulation and demodulation processing unit B3, and the transmitting data modulated is then sent to the main wire B1 so as to be transmitted to the apparatus of the other party.

Then, in Steps S30, S31, coding and modulation processing are performed in the facsimile coding and data conversion processing unit B5 and the facsimile modulation and demodulation processing unit B3 so that all the data stored in the memory B9 are read and transmitted while being subjected to data conversion and data modulation until facsimile communication is completed. When the facsimile communication is completed, a procedure signal or the like for the completion of communication with the facsimile apparatus of the other party is communicated by the facsimile protocol processing unit B6. The processing then proceeds from Step S31 to Step S11 in which the main wire is returned so that the communication is completed.

When a plurality of images are transmitted, the processes in Steps S15 to S19 are repeated several times so that a plurality of images are first stored in the memory B9 and are transmitted in accordance with a known facsimile communication procedure for transmitting a plurality of images.

When communication of all the images is completed, the processing returns to a conversation state by the facsimile procedure, and the processes in Step S15 to S19 are again performed. Then, the next image may be transmitted in accordance with the manual procedure of facsimile transmission.

On the other hand, when the transmitter decides in Step S25 that the apparatus of the other party is a visual telephone set and when the processing proceeds to Step S35, the visual telephone selection key A5 is pushed down in Step S35. When the control unit B12 detects the pushing-down of the visual telephone selection key A5, the processing advances to Step S36, in which the change-over switch S1 is switched so that the main wire B1 is connected to the visual telephone modulation and demodulation processing unit B4 while being connected to the telephone set B2 (while the direct current loop in the main wire being maintained). In Step S37, the change-over switch S2 is switched so that the memory 9 in which the object image to be transmitted has been previously stored is connected to the visual telephone coding and data conversion processing unit B8. Subsequently, in Step S38, the processing units related to a visual telephone such as the visual telephone modulation and demodulation processing unit B4, the visual telephone protocol processing unit B7 and the visual telephone coding and data conversion processing unit B8 are actuated. Then, in Step S39, a procedure signal or the like is communicated with the visual telephone set of the other party of communication by the visual telephone protocol processing unit B7 so that negotiation is performed with the visual telephone set. The transmitting data in the memory B9 is then read, converted (thinning or adding a margin) by the visual telephone coding and data conversion processing unit B8 into a size which can be transmitted to the visual telephone set of the other party in accordance with the predetermined method of visual telephone image communication, subjected to the required modulation processing in the visual telephone modulation and demodulation processing unit B4 and then sent to the main wire B1 to be transmitted to the visual telephone apparatus of the other party.

Then, in Steps S39 and S40, the coding and modulation processing is carried out in the visual telephone coding and data conversion processing unit B8 and the visual telephone modulation and demodulation processing unit B4, and the data stored in the memory B9 is subjected to data conversion and data modulation until all the data are read and completely transmitted. Since a telephone call can be made by using the handset A1 during the time no image information is transmitted, a telephone call is simultaneously made. When a telephonic communication is completed, if a procedure of completing communication is required, a communication end procedure signal or the like is communicated with the visual telephone set of the other party by the visual telephone protocol processing unit B7, and the processing then proceeds to Step S11 in which the main wire B1 is returned so that the visual telephone communication is completed.

When a plurality of images are transmitted, the processes in Steps S15 to S19 are repeated several times, and a plurality of images are first stored in the memory B9 and then transmitted in a known facsimile communication procedure used for transmitting a plurality of images.

When no protocol for transmitting a plurality of images is used, the protocol for transmitting one image may be repeated. In this case, a plurality of images are not stored in the memory B9, but the processes in Steps S15 to S19 may be repeated at each time one image is transmitted.

The above-mentioned transmission processing enables a desired telephonic communication or transmission of image information even if the apparatus of the other party is a normal telephone set, a visual telephone set or facsimile terminal equipment.

A description will now be given of the processing on the called side (receiving side) using the apparatus of this embodiment.

In this embodiment, the main wire B1 is connected to the telephone set B2 by the change-over switch S1 in a normal on-hook state wherein no control operation is performed. When a call is made from the main wire B1, therefore, the call signal is detected by the telephone set B2, and a ring-back tone is output. In this case, the processing proceeds from Step S2 to Step S50 in which a decision is made as to whether or not the called party hooks off the handset A1 and answers. If the called party does not hook off and answer, the processing returns to Step S1.

At this time, if the respondent answers the call and hooks off the handset A1, the processing proceeds from Step S50 to Step S51 in which the calling party is specified. In this step, if the respondent hears a tone output from the handset, i.e., a CNG signal (a carrier tone indicating facsimile equipment on the G3 standard in an operational mode of automatic calling), it is decided that the calling party uses facsimile terminal equipment on the G3 standard. If the calling party is a person, a decision is made by conversations using the handset A1 whether the apparatus of the calling party is a normal telephone set, facsimile terminal equipment or a visual telephone set.

If no CNG signal is transmitted from the calling party, and if there is no speech, it is decided that the calling party uses a visual telephone set operating in an automatic calling mode.

If it is decided in the above-mentioned specific processing that the calling party uses a normal telephone set, the processing proceeds to Step S8, in which telephone call processing is performed in the same way as that described above.

While if it is decided that the calling party uses facsimile terminal equipment, the processing proceeds from Step S51 to Step S55 in which the respondent pushes down the facsimile equipment selection key A6. The control unit B12 which detects the pushing-down of the facsimile equipment selection key A6 switches the change-over switch S1 so that the main wire B1 is connected to the facsimile modulation and demodulation processing unit B3 in Step S56. At the same time, in the facsimile modulation and demodulation processing unit B3, the direct current loop formed in the main wire B1 is controlled so as to remain closed. In Step S57, the change-over switch S2 is switched so that the memory B9 for storing the received data is connected to the facsimile coding and data conversion processing unit B5. Then, in Step S58, the processing units related to facsimile such as the facsimile modulation and demodulation processing unit B3, the facsimile coding and data conversion processing unit B5 and the facsimile protocol processing unit B6 are actuated. In Step S59, a pre-procedure signal or the like is communicated with the facsimile equipment on the calling side by the facsimile protocol processing unit B6, and negotiation is performed with the facsimile equipment on the calling side. Then, the data sent from the main wire B1 is received, demodulated by the facsimile modulation and demodulation processing unit B3, converted (thinning or adding a margin) by the facsimile coding and data conversion processing unit B5 and stored in the memory B9. The same processing is repeated until all the image data of one page is received, and when the data of one page is completely stored in the memory B9, the processing proceeds to Step S60, in which the received data is read by the image display control unit B11 and displayed on the display A2.

When information is continuously received, the processing returns from Step S61 to Step S59 in which data repeatedly received and displayed. During this operation, if required, intermediate procedure processing is executed between the facsimile protocol processing unit B6 and the facsimile equipment of the other party.

When the communication is completed, after procedure processing is executed between the facsimile protocol processing unit B6 and the facsimile equipment of the other party, and then the processing advances to Step S11, in which the main wire B1 is returned so that the communication is finished.

In addition, when a plurality of images are received from facsimile terminal equipment, processing may be performed in the same way as in the case of transmission to facsimile terminal equipment.

On the other hand, when it is decided from the response that the calling party uses a visual telephone set, the processing proceeds from Step S52 to Step S70, in which the visual telephone selection key A5 is pushed down. When the control unit B12 detects the pushing-down of the visual telephone selection key A5, the processing proceeds to Step S71, in which the change-over switch S1 is switched so that the main wire B1 is connected to the visual telephone modulation and demodulation processing unit B4 while being connected to the telephone set B2. Then, in Step S72, the change-over switch S2 is switched so that the memory B9 is connected to the visual telephone coding and data conversion processing unit B8. In Step S73, the visual telephone modulation and demodulation processing unit B4, the visual telephone protocol processing unit B7 and the visual telephone coding and data conversion processing unit B8 are actuated. Then, in Step S74, the visual telephone protocol processing unit B7 is actuated so as to execute pre-procedure communication with the visual telephone set on the calling side and negotiate with the visual telephone set on the calling side. The data transmitted from the telephone set on the calling side through the main wire B1 is then received, demodulated by the visual telephone modulation and demodulation processing unit B4, converted (thinning or adding a margin) by the visual telephone coding and data conversion processing unit B8 and then stored in the memory B9.

The above-mentioned processing is repeated until all the image data of one page is received. When the data of one page is completely stored in the memory B9, the processing advances to Step S75, in which the received data stored in the memory B9 is read by the image display control unit B11 and displayed on the display A2.

When information is continuously received, the processing returns through Step S77 from Step S76 to Step S74, in which data is repeatedly received and displayed. During this operation, if required, intermediate procedure processing is executed between the visual telephone protocol processing unit B7 and the visual telephone set of the calling party.

When the communication is completed, if the protocol for after processing is required, after procedure processing is executed between the visual telephone protocol processing unit B7 and the visual telephone set of the calling party, and then the processing advances from Step S76 to Step S11, in which the main wire is returned so that the communication is finished.

When the communication is completed, if no protocol for after processing is required, the processing immediately returns from Step S76 to Step S11 in which the main wire B1 is returned so that the communication is completed.

Further, since a telephonic communication can be effected by using the handset A1 during the time no image information is transmitted, it is possible to talk over the telephone with the calling party.

On the other hand, when the calling party desires that the object to be transmitted (subject) is photographed and transmitted by the apparatus on the called side, or when it is desired to transmit the object photographed by the apparatus on called side, the processing advances from Step S77 to Step S78 of a photographing process, and then the same processing as the above-mentioned processing in Steps S15 to S20 is performed. Since this control is the same as that described above, it is not described in detail below. Then, in Step S79, the same transmission processing as that in Step S30 described above is carried out so as to transmit photographic information to the other party. Then, the processing proceeds to Step S74 in which the next data is received and the communication is continued.

When the telephonic communication is completed and the end procedure communication is entered, if required, after procedure communication is performed between the visual telephone protocol processing unit B7 and the visual telephone set of the other party. The processing then advances from Step S76 to Step S11 in which the main wire is returned so that the visual telephone communication is completed.

The above-mentioned transmission processing enables desired telephonic communication or receiving of image information even if the apparatus of the other party is a normal telephone set, a visual telephone set or facsimile terminal equipment.

In the above-described embodiment, the other party of transmission and the apparatus of the calling side are specified by the operator oneself, and the communication control of this apparatus is manually indicated in accordance with the results of specification performed by the operator.

Figure 4A:
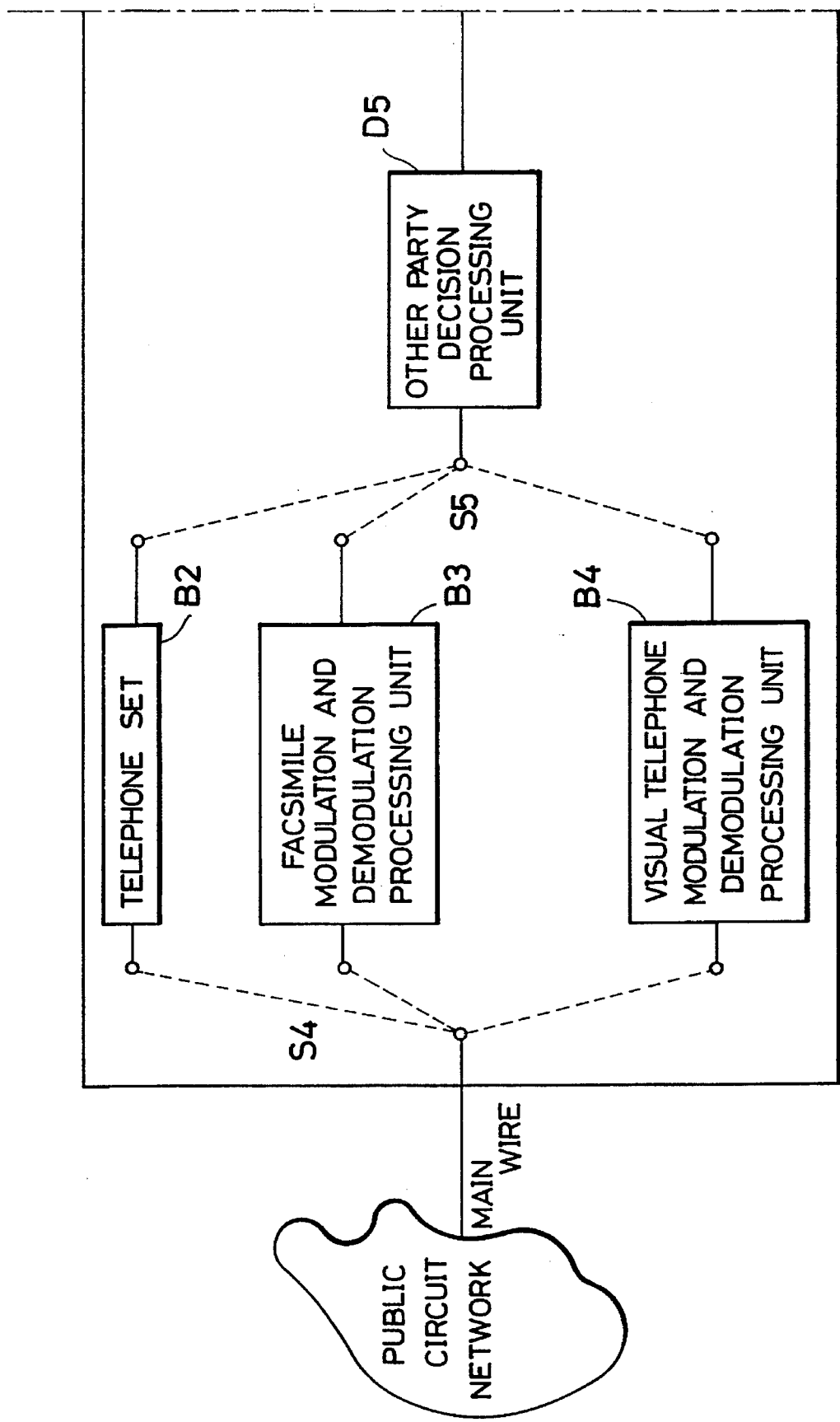
FIGS. 4A and 4B are block diagrams of the visual telephone apparatus in another embodiment of the present invention.
Figure 4B:
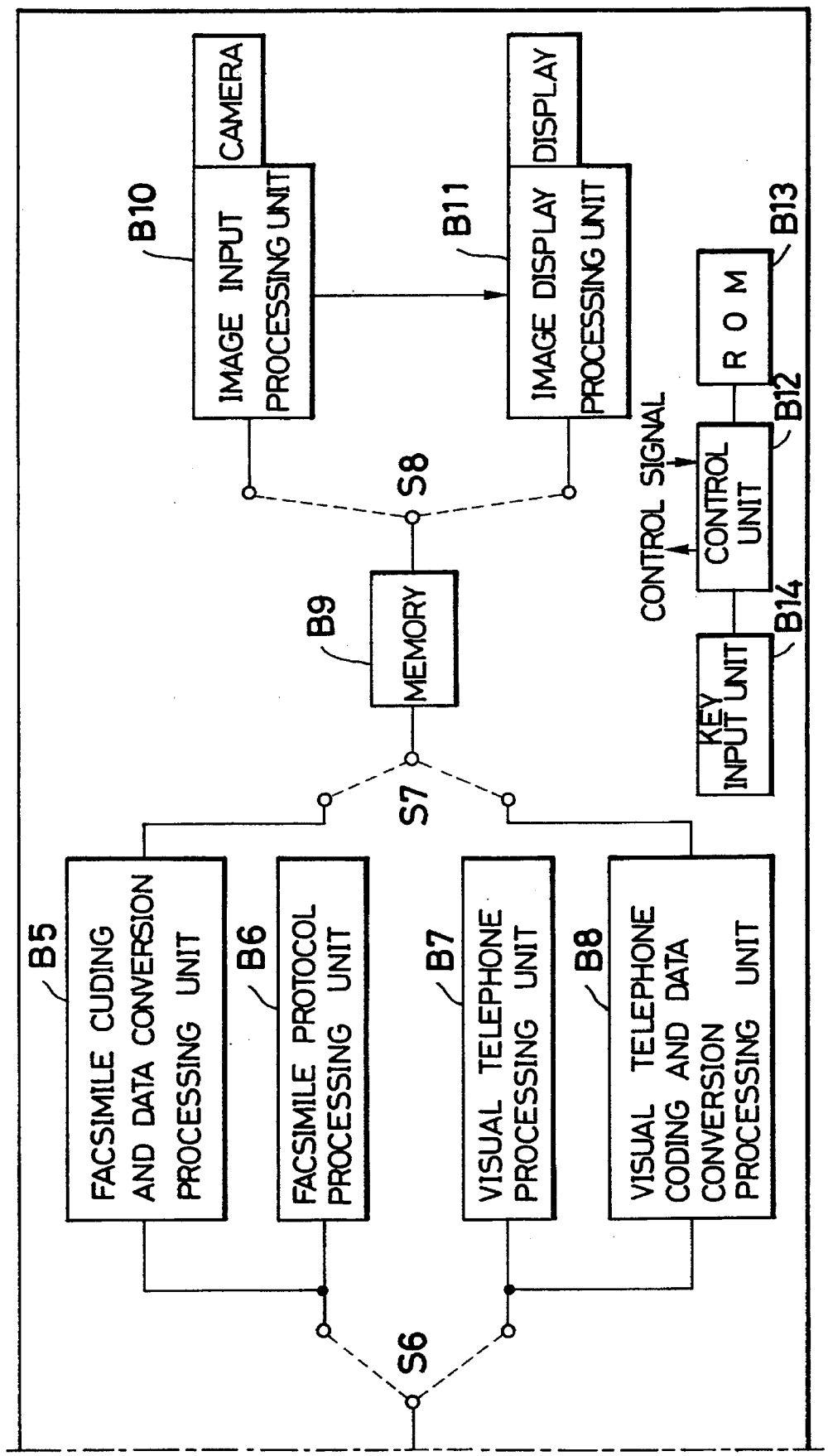
Figure 6A:
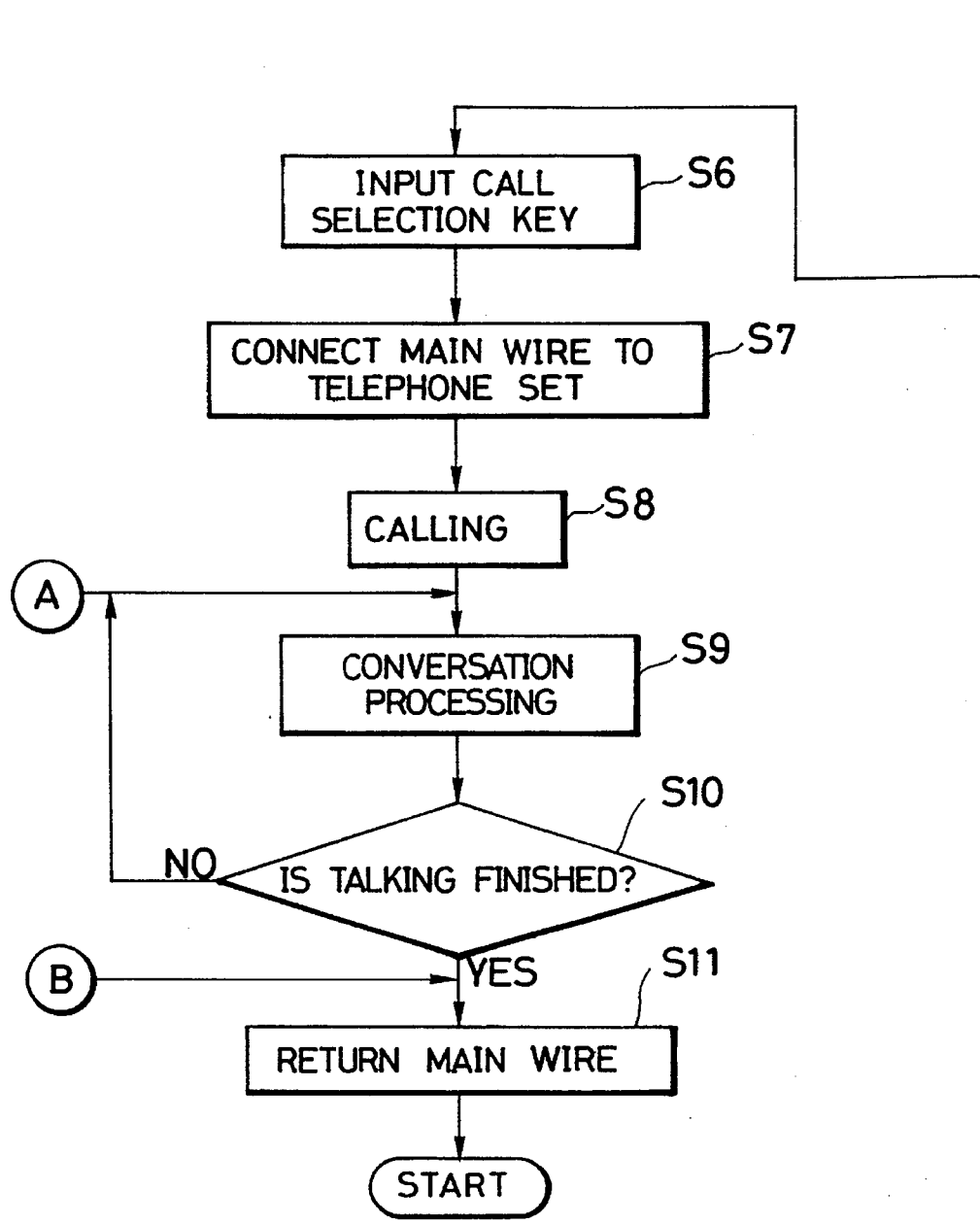
FIGS. 6A to 6H are flowcharts of the communication control of the embodiment.
Figure 6B:
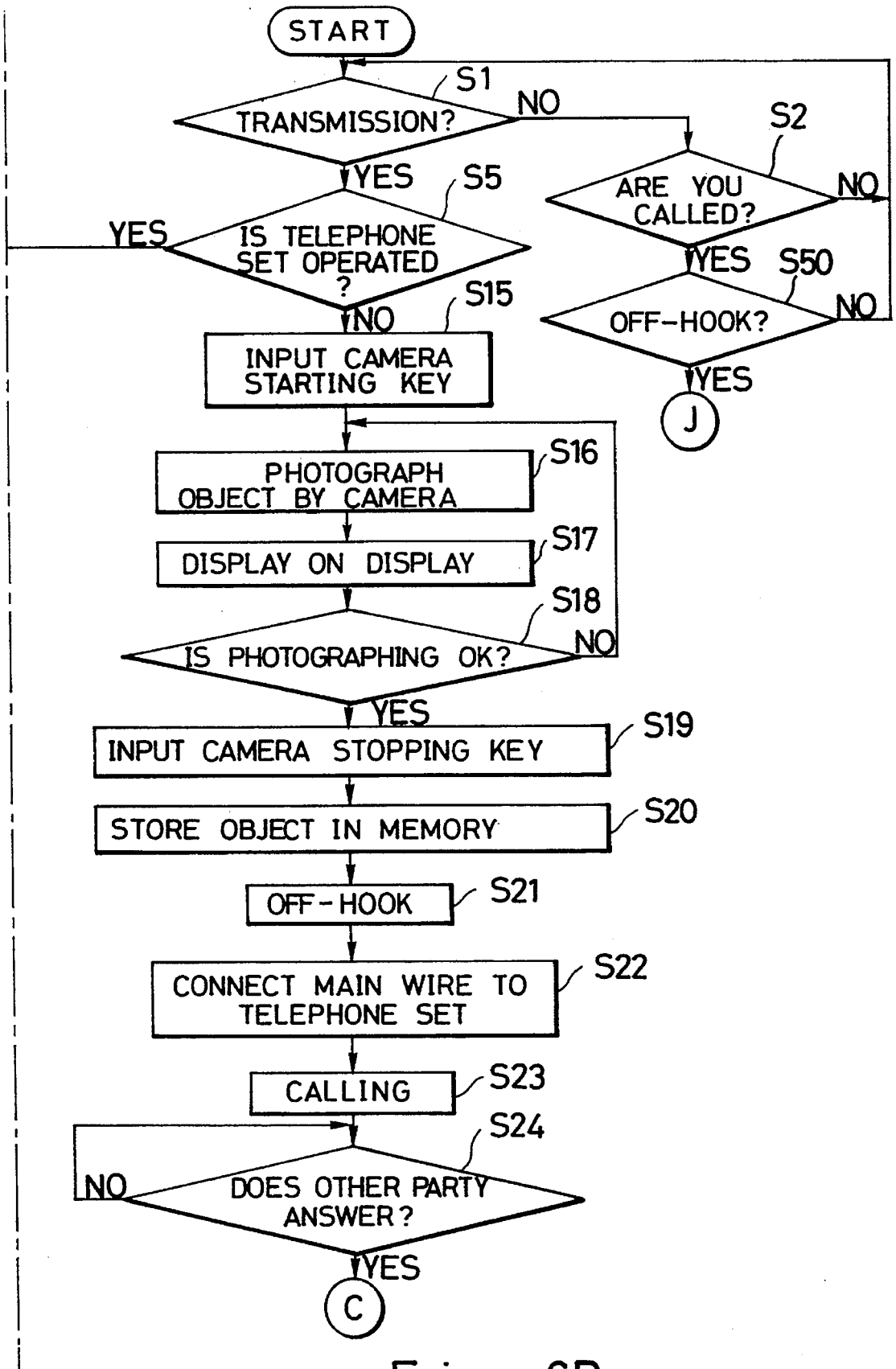
Figure 6C:
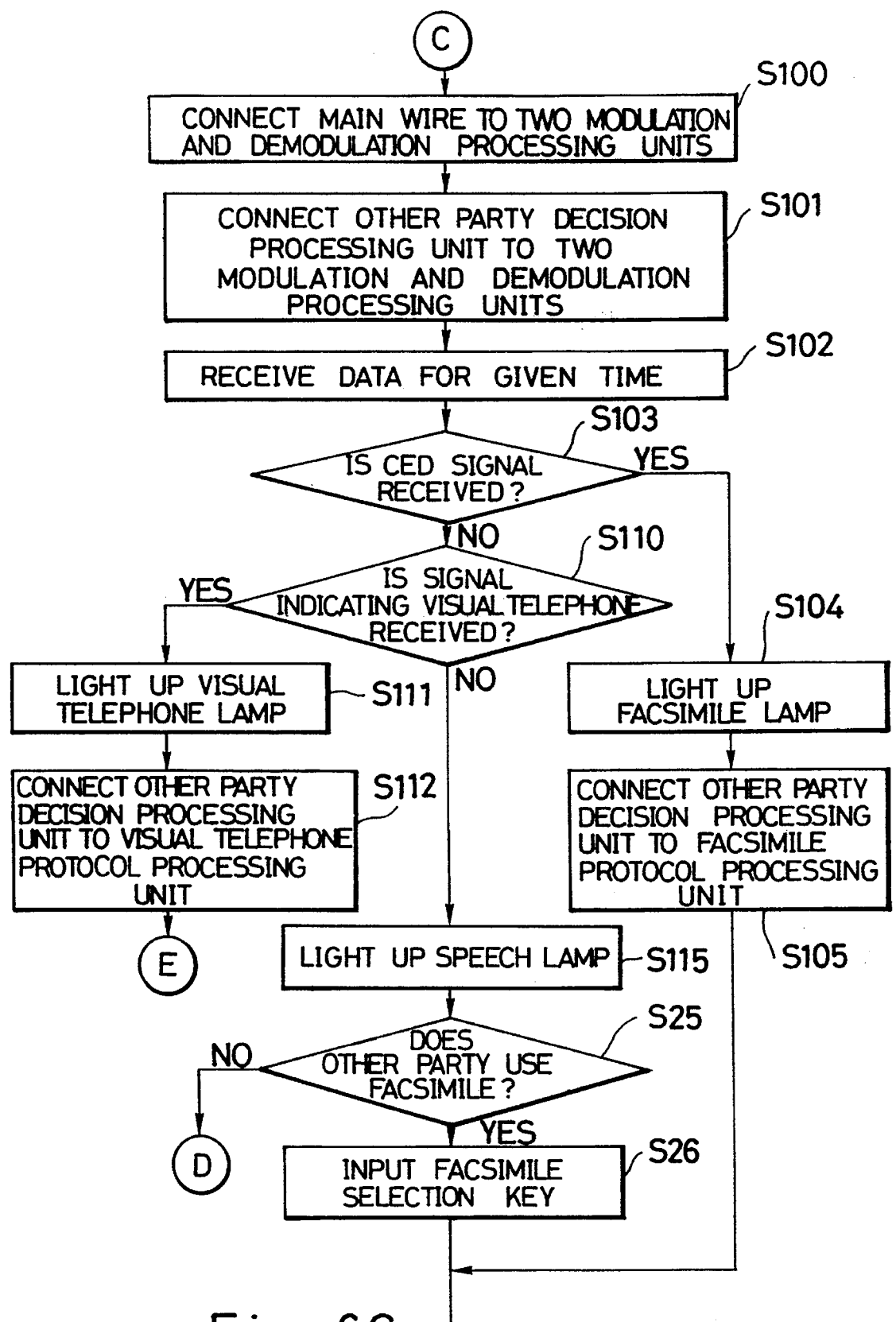
Figure 6D:
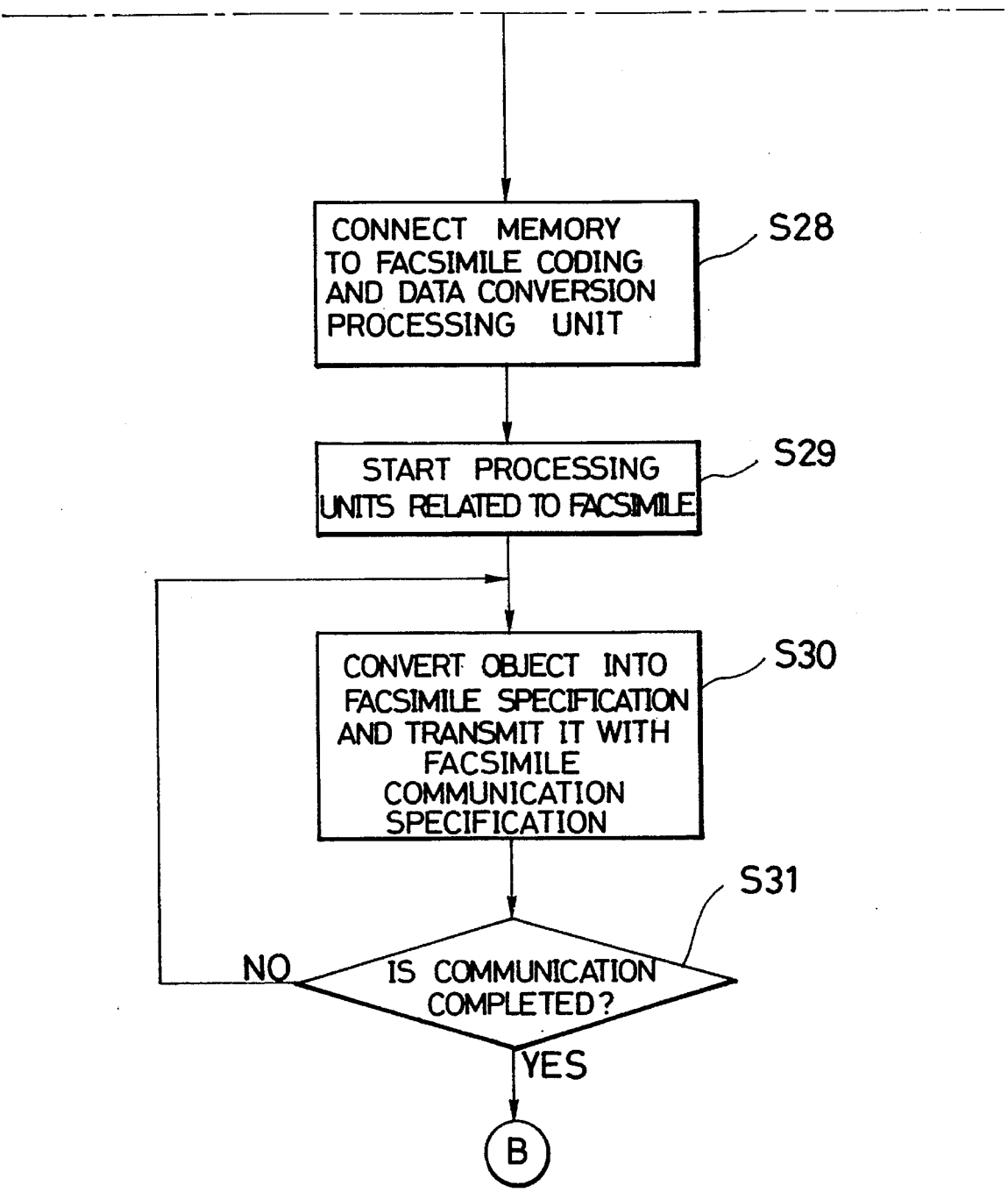
Figure 6E:
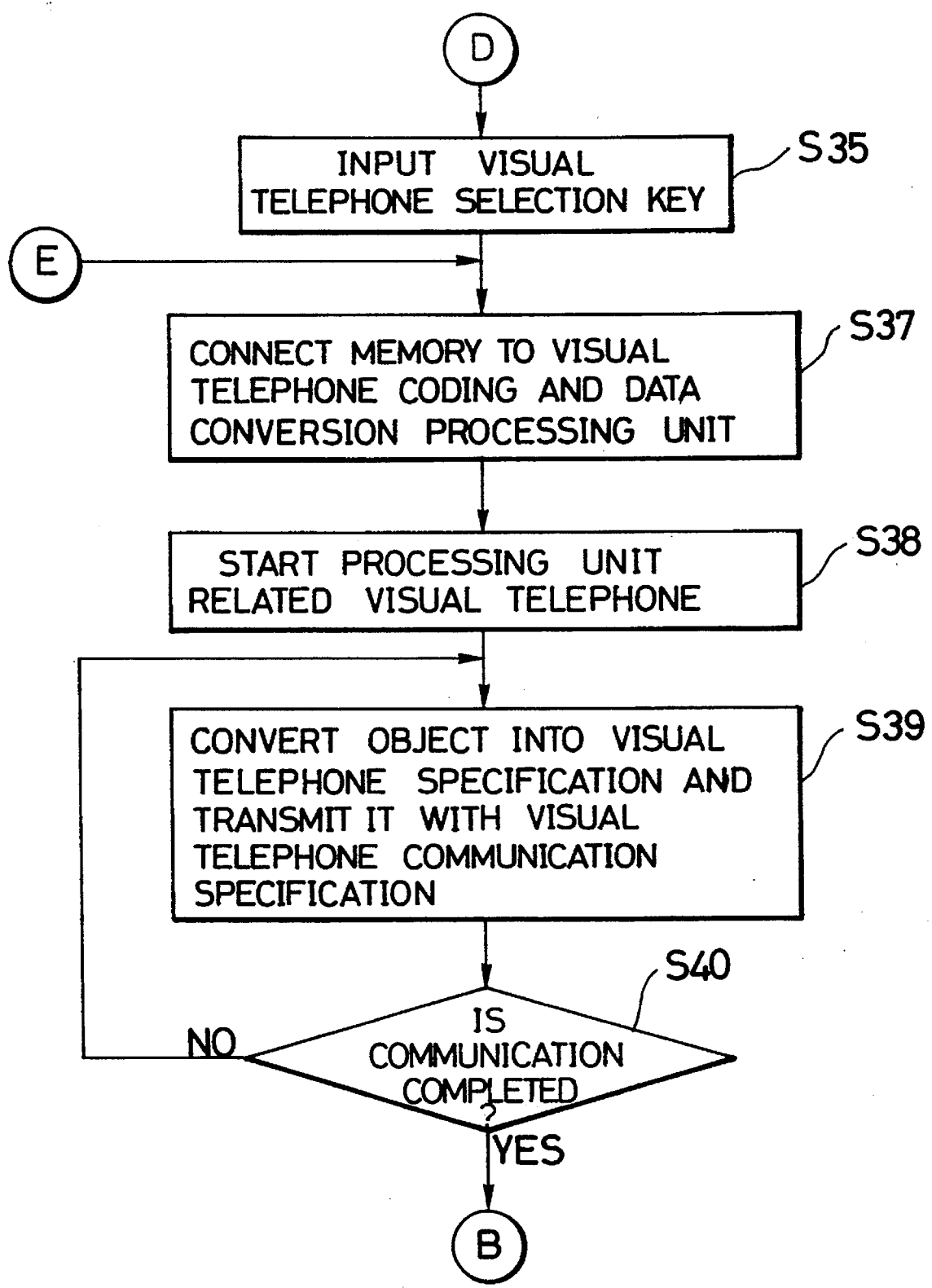
Figure 6F:
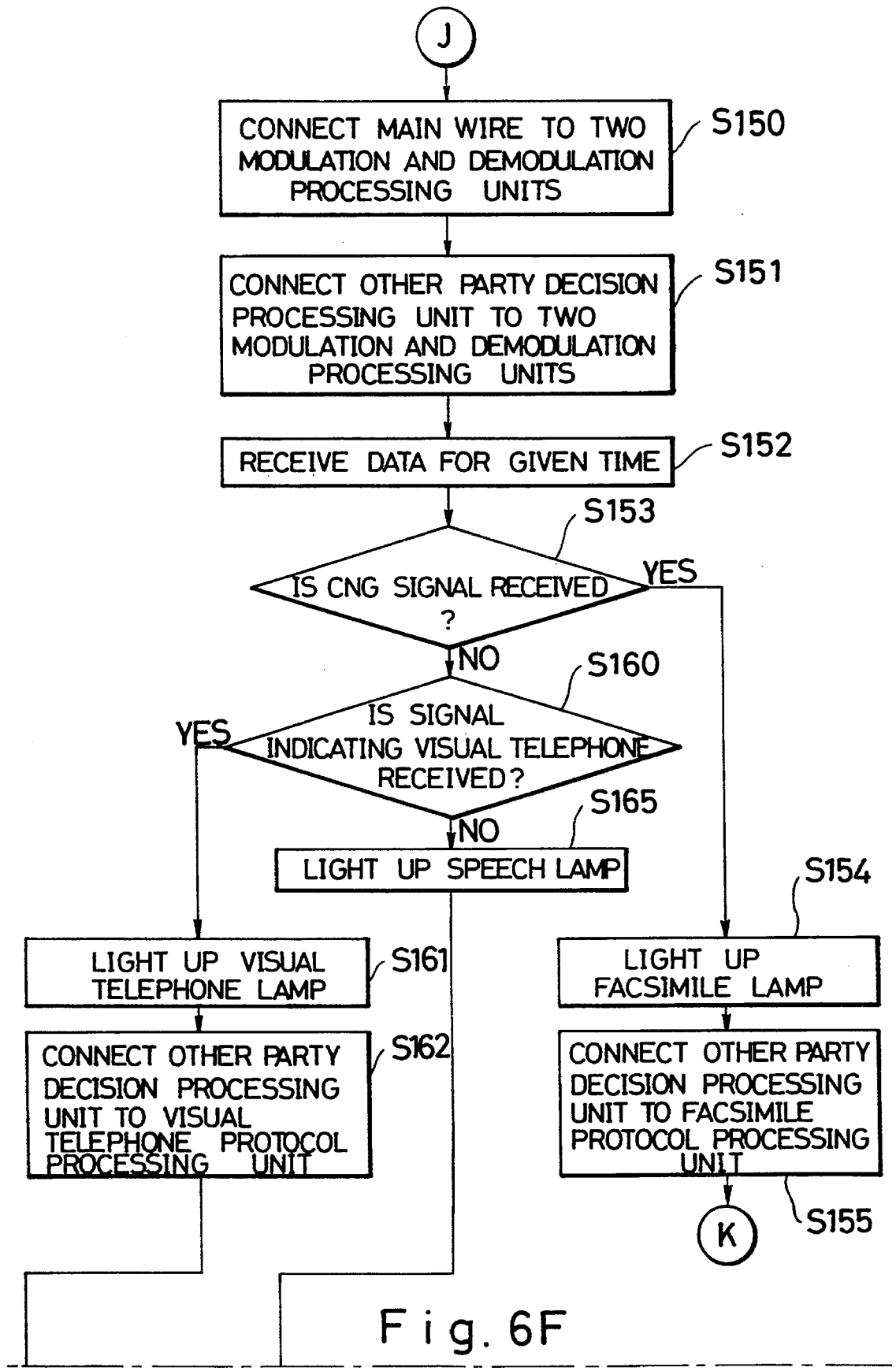
Figure 6G:
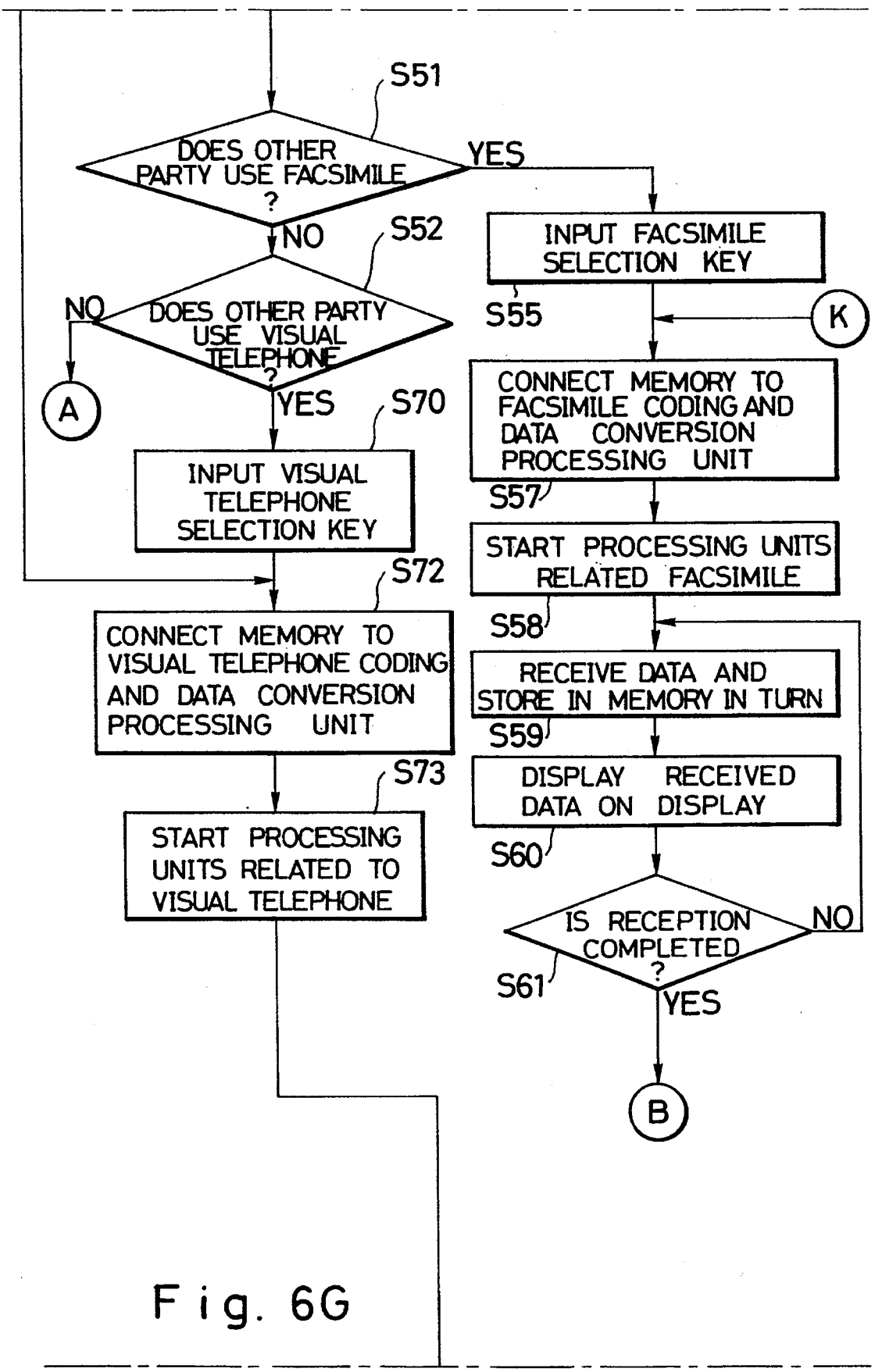
Figure 6H:
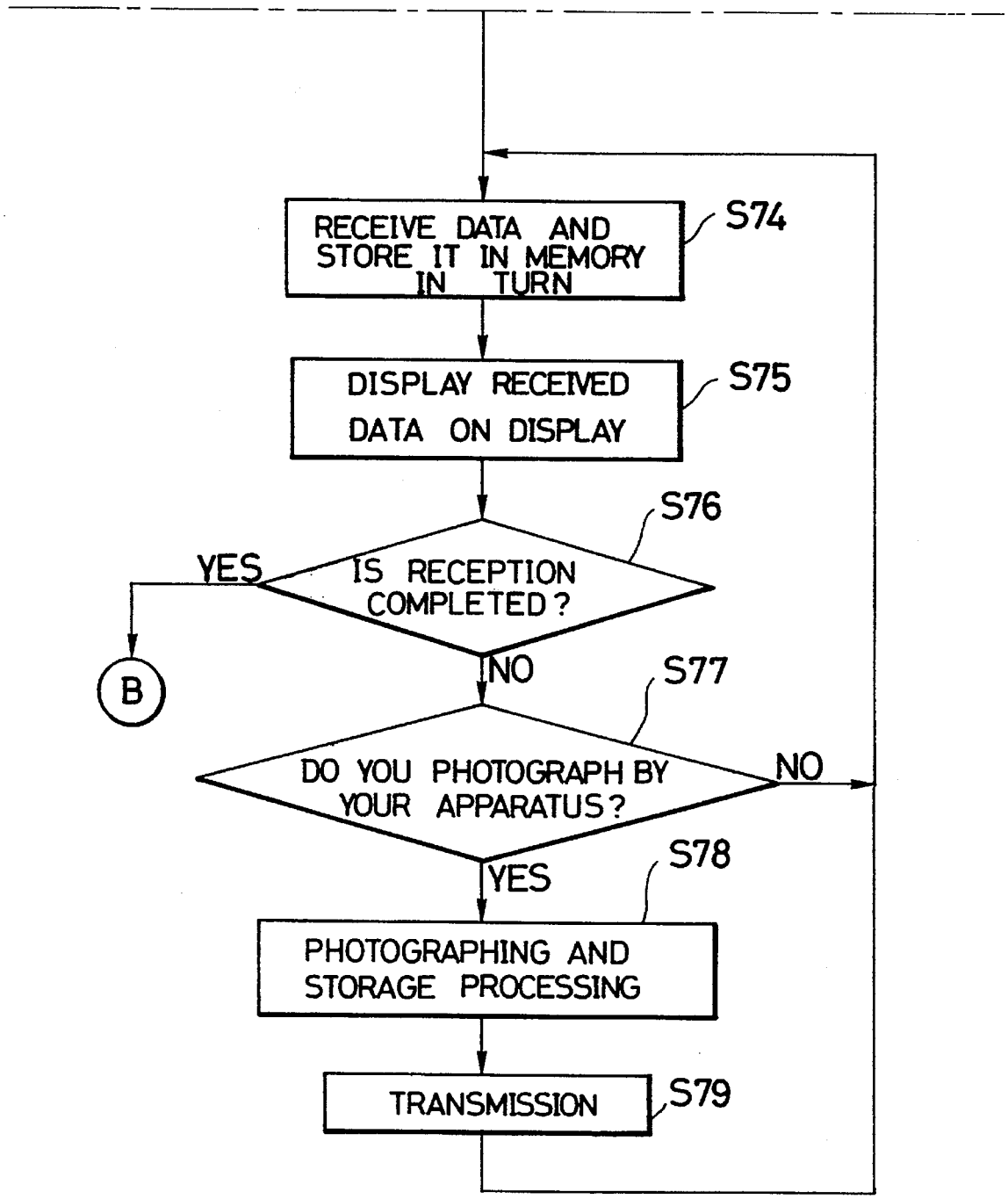

However, the present invention is not limited to this embodiment, and such decision and indication may be automatically conducted. FIGS. 4A to 4B shows a block diagram in another embodiment of the present invention in which such decision and indication are automatically performed.

In FIGS. 4A to 4B, the same units as those shown in FIG. 1 are denoted by the same reference numerals and are not described in detail below.

In FIGS. 4A to 4B, the embodiment comprises the arrangement shown in FIG. 1 and an other party decision processing unit D5 which is newly added to the arrangement and which serves to decide whether the other party of communication uses facsimile equipment, a visual telephone set or a normal telephone set. Switches are also arranged in the manner described below in accordance with the addition of the other party decision processing unit D5.

A change-over switch S4 is a change-over switch which is capable of connecting and cutting off the main wire with and from the telephone set B2, the facsimile modulation and demodulation processing unit B3 and the visual telephone modulation and demodulation processing unit B4. A change-over switch S5 is capable of connecting and cutting off the other party decision processing D5 with and from the telephone set B2, the facsimile modulation and demodulation processing unit B3 and the visual telephone modulation and demodulation processing unit B4. A change-over switch S6 is a change-over switch for connecting the other party decision processing D5 with either the facsimile protocol processing unit B6 or the visual telephone protocol processing unit B7. A change-over switch S7 is a change-over switch for connecting the memory B9 with either the facsimile coding and data conversion processing unit B5 or the visual telephone coding and data conversion processing unit B8. A change-over switch S8 is a change-over switch for connecting the memory B9 with either the image input processing unit B10 or the image display processing unit B11.

Figure 5:
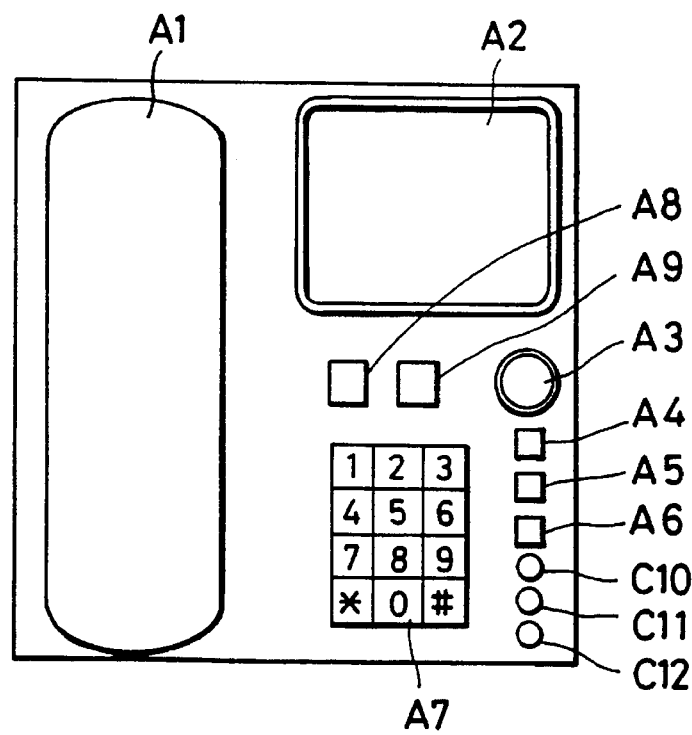
FIG. 5 is a drawing of the appearance of the visual telephone apparatus of the other embodiment.
Figure 3A:
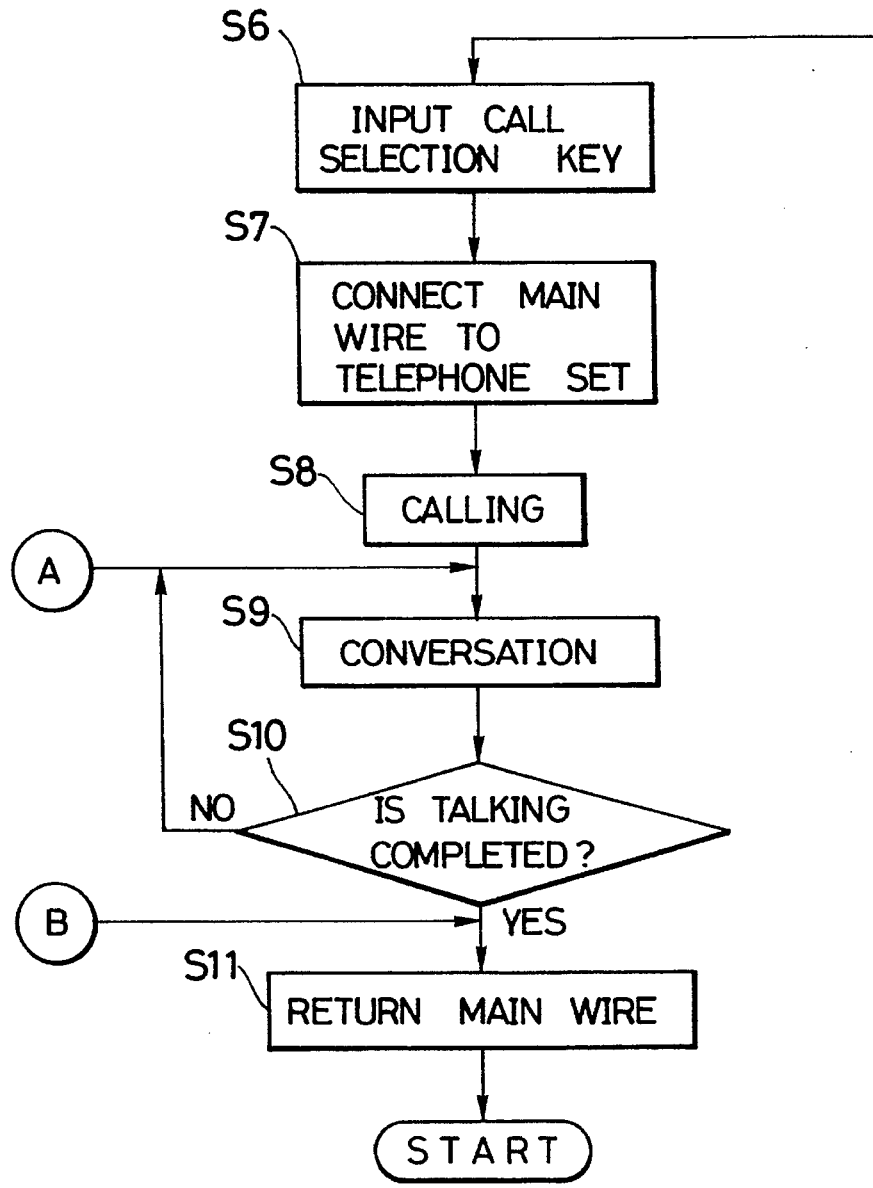
Figure 3B:
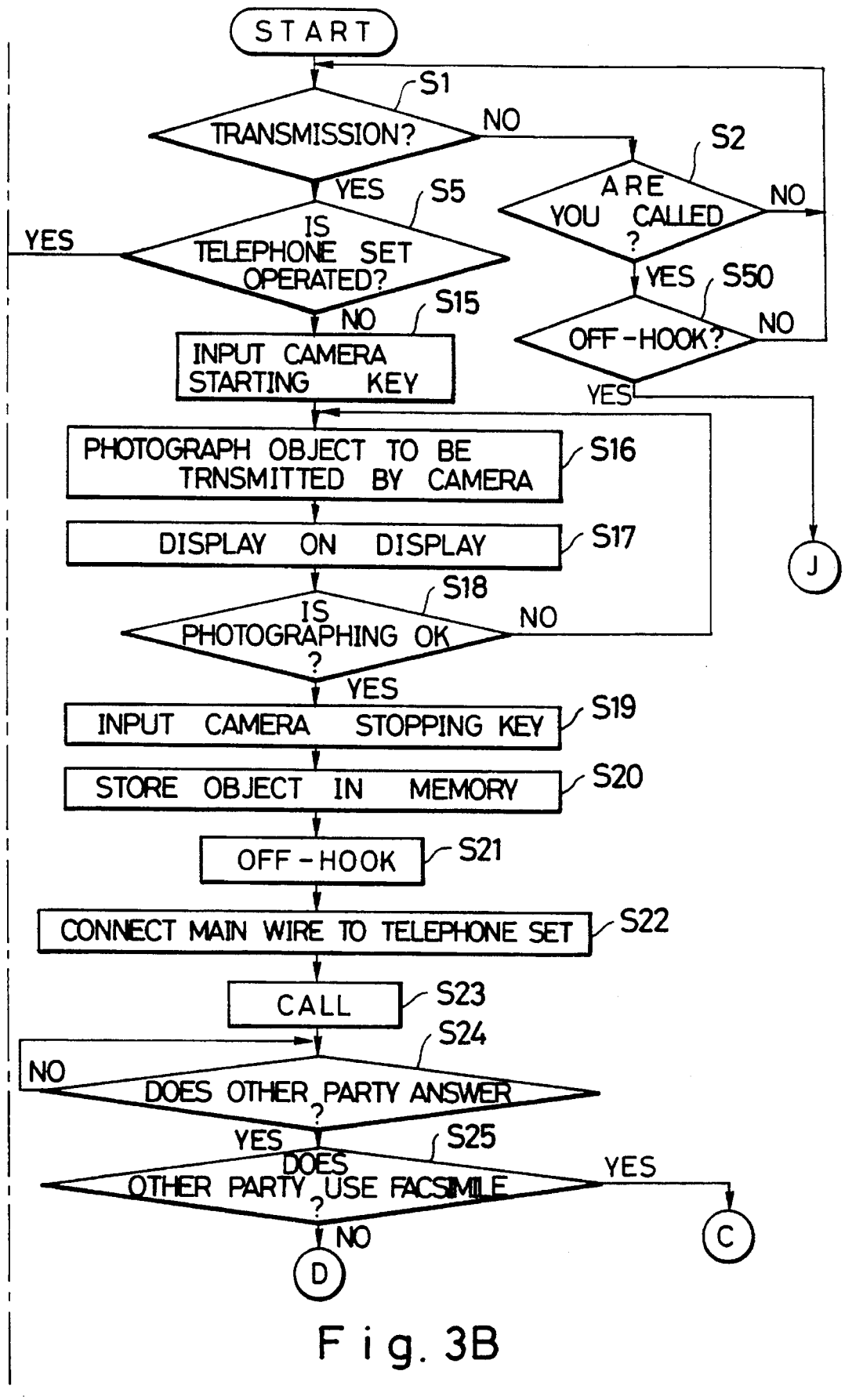
Figure 3E:
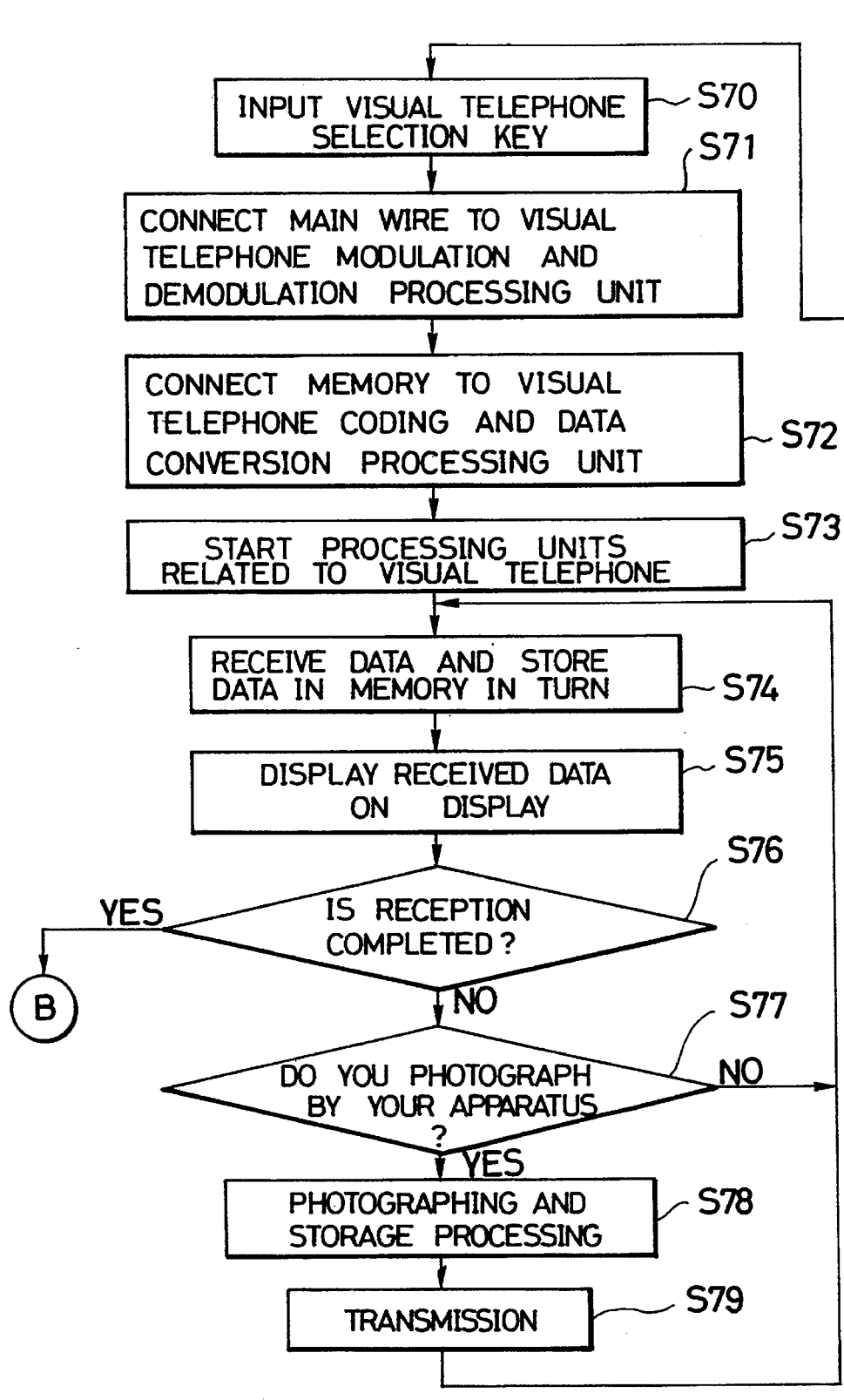
Figure 3F:
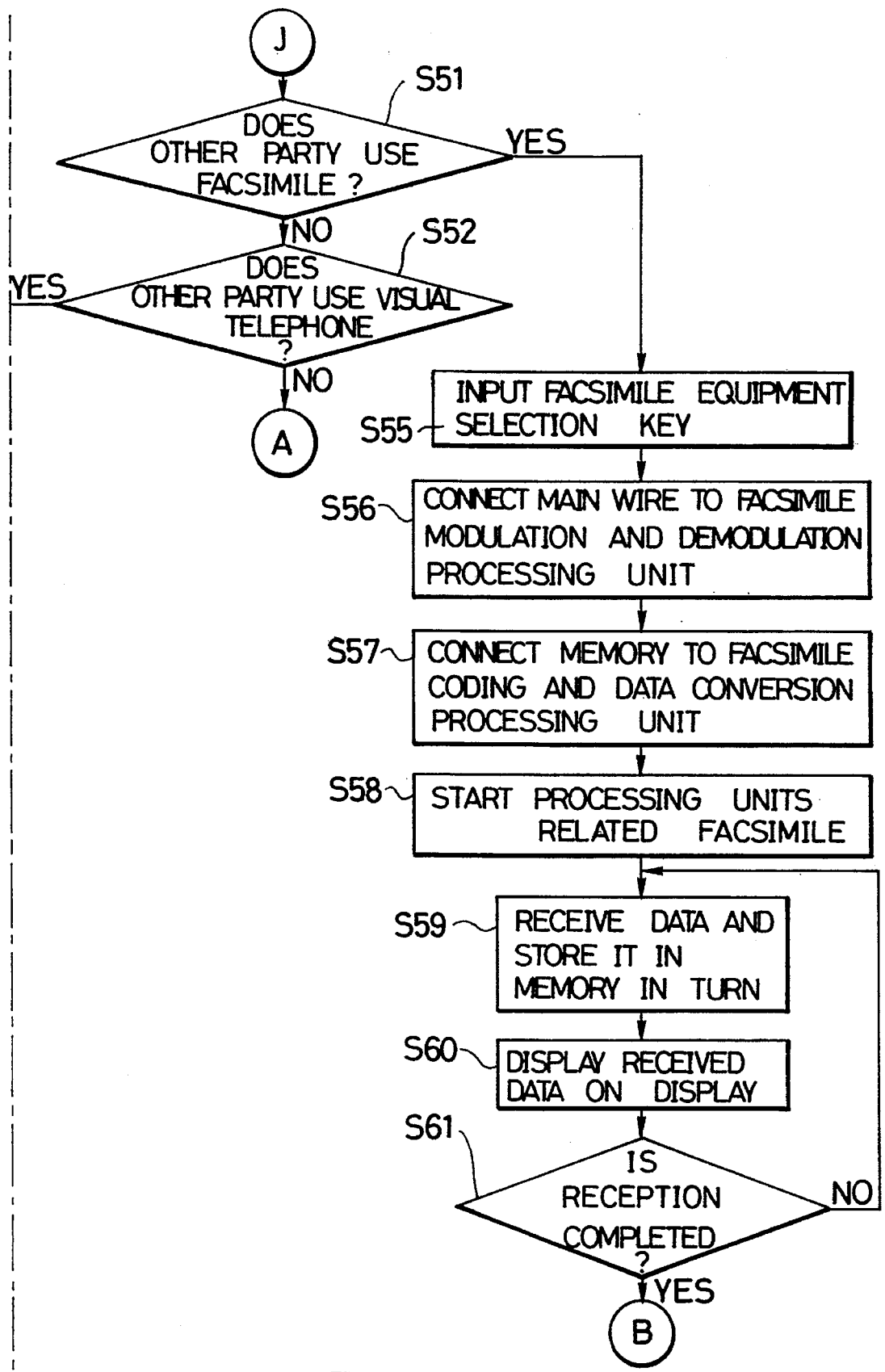

FIG. 5 shows the appearance of the apparatus in this embodiment with the aforementioned arrangement. In FIG. 5, the same units as those shown in FIG. 2 are denoted by the same reference numerals and are not described in detail below.

The apparatus shown in FIG. 5 has a configuration in which a visual telephone lamp C10 (a lamp for indicating that the other party serving as a visual telephone can receive data), a facsimile equipment lamp C11 (a lamp for indicating that the other party serving as as a facsimile can receive data) and a speech lamp C12 (a lamp for indicating that the other party uses neither a facsimile nor a visual telephone) are newly added to the apparatus shown in FIG. 2.

The communication control of this embodiment having the aforementioned configuration is described below with reference to the flowcharts shown in FIGS. 6A to 6H. The steps of communication control processing which are the same as those in the above-described first embodiment shown in FIGS. 3A to 3F are denoted by the same step numbers and are thus not described in detail below.

In the case of transmission from this apparatus to the other party using a normal telephone set, when the call selection key A4 is input by the other party, the call processing is performed with the normal telephone set by the above-described processing in Steps S6 to S11 through Steps S1 and S5.

When the other party does not use a normal telephone set, the same processing as that described above in Steps S15 to S24 is carried out through Steps S1 and S5 so that the object to be transmitted is photographed by the camera A3 and displayed on the display A2. After the transmitter has confirmed by observing the image displayed that the image is satisfactory to be transmitted, the camera stopping key A9 is pushed down, and the object to be transmitted is stored in the memory B9. The transmitter then hooks off the handset of the telephone set B2 so as to perform the call processing and waits for an answer of the other party. The processing up to this stage is substantially the same control as that in the above-described first embodiment.

When the other party answers, the processing proceeds from Step S24 to Step S100 and the subsequent steps, in which the processing of deciding on the respondent is executed by the control unit B12. In other words, in Step S100, the switch S4 is first switched so that the main wire B1 is connected to both the facsimile modulation and demodulation processing unit B3 and the visual telephone modulation and demodulation processing unit B4. Then, in Step S101, the switch S5 is switched so that the other party decision processing unit D5 is connected to both the facsimile modulation and demodulation processing unit B3 and the visual telephone modulation and demodulation processing unit B4. In the subsequent Step S102, the other party decision processing unit D5 serves to examine the data received through the two modulation and demodulation processing units for a predetermined time. As a result, when the unit D5 detects the CED signal transmitted from the other party, it is decided that the apparatus of the other party is facsimile terminal equipment, and the processing advances from Step S103 to Step S104 in which the facsimile equipment lamp C11 is lighted up so as to inform the transmitter of the fact that the other party uses facsimile equipment. In Step S105, the change-over switch S6 is switched so that the other party decision processing unit D5 is connected to the facsimile protocol processing unit B6. The processing then advances to Step S28, in which the change-over switch S7 is switched so that the facsimile coding and data conversion processing unit B5 is connected to the memory B9. Then, the transmission processing is performed using the protocol conformed to the specification of the apparatus of the other party and the data specification of the apparatus thereof in the same manner as in the above-mentioned Steps S29 to S31 and Step S11.

In addition, when it is decided that the other party uses facsimile equipment, connection is not immediately effected in an automatic manner, but communication may be started after the operator has pushed down the facsimile equipment selection key A6.

On the other hand, when no CED signal is received from the other party in Step S103, the processing proceeds to Step S110, in which an examination is made as to whether or not the other party outputs the predetermined signal indicating that the other party uses a visual telephone apparatus. If the signal indicating that the other party uses a visual telephone apparatus is detected, it is decided that the apparatus of the other party is a visual telephone apparatus, and the processing then advances to Step S111, in which the visual telephone lamp C10 is lighted up so as to inform the transmitter the fact that the other party uses a visual telephone set. Then, in Step S112, the change-over switch S6 is switched so that the other party decision processing unit D5 is connected to the visual telephone protocol processing unit B7. The processing then proceeds to Step S37 in which the visual telephone coding and data conversion processing unit B8 is connected to the memory B9 by using the change-over switch S7, and then the above-mentioned communication processing in Step S38 and the subsequent steps is performed so that the object to be transmitted is transmitted in accordance with the predetermined image communication method for a visual telephone in the same manner as that described above.

During this operation, if it is decided that the other party uses a visual telephone set, communication may be started after the operator has pushed down the visual telephone selection key A5.

When no signal indicating that the other party uses a visual telephone apparatus is detected in Step S110, it is decided that a person answers, and the processing proceeds to Step S115, in which the control unit B12 causes the speech lamp C12 to light up and induces the operator to talk. The processing then proceeds to Step S25, in which a confirmation is made by the respondent from talking with the transmitter whether communication is performed by facsimile equipment or a visual telephone set. As a result, in the case of facsimile communication, the processing proceeds to Step S26, in which the operator pushes down the facsimile equipment selection key A6, and then advances to Step S28.

While, in the case of visual telephone communication, the processing proceeds to Step S35, in which the operator pushes down the visual telephone selection key A5 and then proceeds to Step S37.

Although the above description concerns the call processing, the decision and the indication are automatically performed on the side called from the main wire B1 by the same processing as that described above.

In this embodiment, the main wire is generally connected to the telephone set B2 so that a ring tone is generated from the telephone set B2 on the side called from the main sire B1. When the operator who hears the ring tone hooks off the handset A1 and answers, the processing of the control unit B12 proceeds from Step S50 to Step S150 and the subsequent steps, in which the processing of deciding on the other party of the communication is automatically performed. In other words, in Step S150, the switch S4 is first switched so that the main wire B1 is connected to both the facsimile modulation and demodulation processing unit B3 and the visual telephone modulation and demodulation processing unit B4 in the same manner as in Step S100. Then, in the subsequent Step S151, the switch S5 is switched so that the other party decision processing unit D5 is connected to both the facsimile modulation and demodulation processing unit B3 and the visual telephone modulation and demodulation processing unit B4 in the same manner as in Step S101.

Then, in Step S152, the other party decision processing unit D5 serves to examine the data received through the two modulation and demodulation processing units for a given time in the same manner as in Step S102. As a result, when the unit D5 detects the CED signal transmitted from the other party, it is decided that the apparatus of the other party is facsimile terminal equipment, and the processing proceeds from Step S153 to Step S154, in which the facsimile equipment lamp C11 is lighted so as to inform the operator (respondent) the fact that the other party uses facsimile equipment. In Step S155, the change-over switch S6 is switched so that the other party decision processing unit D5 is connected to the facsimile protocol processing unit B6. The processing then proceeds to Step S57, in which the change-over switch S7 is switched so that the facsimile coding and data conversion processing unit B5 is connected to the memory B9. Then, in the same manner as in the above-described Steps S58 to S61 and Step S11, data is received by using the protocol conformed to the specification of the apparatus of the other party and the data specification thereof, stored in the memory B9 and displayed on the display A2.

Even if it is decided that the other party uses facsimile equipment, connection is not immediately made in an automatic manner, but communication may be started after the operator has pushed down the facsimile equipment selection key A6.

While when no CED signal is received from the other party in Step S153, the processing proceeds to Step S160 in which a decision is made as to whether or not the predetermined signal indicating a visual telephone apparatus is transmitted from the other party. When the signal indicating a visual telephone apparatus is detected, it is decided that the apparatus of the other party is a visual telephone set, and the processing then advances to Step S161, in which the visual telephone lamp C10 is lighted up so as to inform the operator the fact that the other party uses a visual telephone set. Then, in Step S162, the change-over switch S6 is switched so that the other party decision processing unit D5 is connected to the visual telephone protocol processing unit B7 in the same manner as in Step S112, and the processing then proceeds to Step S72. In Step S72, the change-over switch S7 is switched so that the visual telephone coding and data conversion processing unit B8 is connected to the memory B9. Then, communication processing is performed in the above-described Step S73 and the subsequent steps so that the data transmitted is demodulated and received, coded, stored in the memory B9 and displayed on the display A2 in accordance with the predetermined communication method of visual telephone images in the same manner as that described above. If required, the image photographed by the camera A3 is transmitted from the apparatus of this embodiment to the other party.

During this operation, even if it is decided that the other party uses a visual telephone set, communication may be started after the operator has pushed down the visual telephone selection key A5.

When no signal indicating that the other party uses a visual telephone apparatus is detected in Step S160, it is decided that a person answers, and the processing proceeds to Step S165 in which the control unit B12 causes the speech lamp C12 to light up and induces the operator to talk. The processing then advances to Step S51 in which the respondent confirms by conversations with the transmitter whether communication is performed by facsimile equipment or a visual telephone apparatus. As a result, in the case of facsimile communication, the processing proceeds to Step S55 in which the operator pushes down the facsimile equipment selection key A6 and then advances to Step S57.

While, in the case of visual telephone communication, the processing proceeds from Step S52 to Step S70, in which the operator pushes down the visual telephone selection key A5 and then advances to Step S72.

If the call selection key A4 is pushed down for inputting in the course of the above-described series of processing, the change-over switch is immediately controlled so that the main wire B1 is connected to the telephone set B2 to bring about a talking state.

Although each of the above-described first and second embodiments concerns as an example a case in which a visual telephone set is capable of transmitting and receiving data to and from another visual telephone set and facsimile terminal equipment, an embodiment may be arranged in such a manner that data transmission or reception is possible only for facsimile terminal equipment.

In the case of an arrangement in which transmission is possible only for facsimile equipment, it is unnecessary to modify the configuration shown in FIG. 1 in which the decision and the indication are manually made as to whether the apparatus of the other party is a visual telephone set or facsimile equipment and the arrangement shown in FIGS. 4A to 4B in which the decision and the indication are automatically made.

In this case, however, when the decision and indication are either manually or automatically made or when the other party uses facsimile equipment, if the other party employs a manual transmission method, the subsequent transmission and reception processing is not carried out (the above-mentioned processing in Steps S55 to S61 is not performed), and then a talking state is returned or a cutting command is transmitted so as to return the original state.

In addition, when data is received from facsimile equipment, the control unit B12 controls the operation of the facsimile key A6 shown in FIGS. 2 and 5 so as to become ineffective.

In the case of the arrangement in which reception is possible only from facsimile equipment, it is unnecessary to modify the arrangement shown in FIG. 1 in which the decision and the indication are manually made as to whether the apparatus of the other party is a visual telephone set or facsimile equipment and the arrangement shown in FIGS. 4A to 4B in which the decision and the indication are automatically made.

In this case, however, when the decision and indication are manually or automatically made, if it is decided that the apparatus of the other party is facsimile equipment when an image is transmitted, in the case of manual transmission, the subsequent transmission and reception processing is not performed (the above-described processing in Steps S26 to S31 is not carried out), and then a talking state is returned or a cutting command is transmitted to return the initial state.

When data is transmitted to facsimile terminal equipment, the operation of the facsimile key A6 shown in FIG. 2 and FIG. 5 is controlled so as to become ineffective in the control unit B1.

Each of the above-mentioned embodiments has the effect of enabling image data to be transmitted to and received from both of a visual telephone set and facsimile terminal equipment by providing a visual telephone apparatus with a facsimile modulator and demodulator, a facsimile protocol, a means for deciding whether visual telephone or facsimile communication is employed, means for specifying and selecting either visual telephone or facsimile communication and means for converting data of visual telephone to data of a facsimile and vice versa.

As described above, the present invention enables communication with either visual telephone apparatus or facsimile terminal equipment.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus having a facsimile communication function and a visual telephone communication function, comprising:

image pick up means for picking up an object image for communication;

discrimination means for discriminating whether a destination station is a facsimile or a visual telephone apparatus;

decision means for deciding a number of pixels of the image picked up by said image pick up means; and transmission means for transmitting the decided pixels, wherein if said discrimination means discriminates that the destination station is a facsimile apparatus, said decision means decides a number of pixels of the image appropriate to the facsimile apparatus, and wherein if said discrimination means discriminates that the destination station is a visual telephone apparatus, said decision means decides a number of pixels of the image appropriate to the visual telephone apparatus.

2. The apparatus according to claim 1, wherein said decision means thins out the picked-up image data.

3. The apparatus according to claim 1, wherein said decision means adds a margin space to the picked-up image data.

4. The apparatus according to claim 1, wherein said image pick up means is a camera.

5. The apparatus according to claim 1, wherein said discrimination means makes a discrimination by receiving a CED signal and a predetermined signal indicating that destination station is a visual telephone apparatus from the destination station.

6. The apparatus according to claim 1, further comprising modulation means for modulating the decided pixels.

7. The apparatus according to claim 6, wherein said modulation means has a facsimile modulation unit and a television modulation unit.

8. A visual telephone apparatus having a facsimile communication function and a visual telephone communication function and being capable of performing a plurality of protocols, comprising:

decision means for deciding whether a destination station is a facsimile or a visual telephone apparatus;

indicating means for indicating a type of the destination station decided by said decision mean;

automatic change-over means for automatically switching to a predetermined protocol in accordance with the apparatus type of the destination station decided by said decision means;

conversion means for, after the predetermined protocol has been performed, performing conversion on communication data in accordance with the type of the destination station decided by said decision means; and instruction means for instructing a start of transmission of the communication data converted by said conversion means.

9. The apparatus according to claim 8, wherein said decision means makes a decision by receiving a CED signal and a predetermined signal indicating that the destination station is a visual telephone apparatus from the destination station.

10. The apparatus according to claim 8, wherein said indicating means indicates the type of the destination station on a display unit.

11. The apparatus according to claim 8, further comprising modulation means for modulating the communication data.

12. The apparatus according to claim 11, wherein said modulation means has a facsimile modulation unit and a television modulation unit.

13. A visual telephone apparatus having a facsimile communication function and a visual telephone communication function and being capable of performing a plurality of protocols, comprising:

decision means for deciding whether an originator station is a facsimile or a visual telephone apparatus;

indicating means for indicating a type of the originator station decided by said decision mean;

automatic change-over means for automatically connecting to a predetermined protocol in accordance with the apparatus type of the originator station decided by said decision means; and instruction means for instructing a start of communication with the originator station.

14. The apparatus according to claim 13, wherein said decision means makes a decision by receiving a CED signal and a predetermined signal indicating that the originator station is a visual telephone apparatus from the originator station.

15. The apparatus according to claim 13, wherein said indicating means indicates the type of the originator station on a display unit.

16. A communication apparatus having a facsimile communication function and a visual telephone communication function, comprising:

processing means for deciding whether a destination station is a facsimile or a visual telephone apparatus and performing a protocol exchange with the destination station;

indicating means for indicating a type of the destination station decided by said processing means;

conversion means for performing conversion on communication data in accordance with the type of the destination station based on a processing result by said processing means; and instruction means for instructing to start transmission of the communication data converted by said conversion means.

17. The apparatus according to claim 16, wherein said processing means makes a decision by receiving a CED signal and a predetermined signal indicating that the destination station is a visual telephone apparatus from the destination station.

18. A communication apparatus having a facsimile communication function and a visual telephone communication function, comprising:

processing means for deciding whether an originator station is a facsimile or a visual telephone apparatus and for performing a protocol exchange with the originator station;

indicating means for indicating a type of the originator station based on a processing result by said processing means; and instruction means for instructing a start of communication with the originator station.

19. The apparatus according to claim 18, wherein said processing means makes a decision by receiving a CED signal and a predetermined signal indicating that the originator station is a visual telephone apparatus from the originator station.

* * * * *

UNITED STATES PATENT AND TRADEMARK OFFICE
CERTIFICATE OF CORRECTION

PATENT NO. : 5,610,975 Page 1 of 1
DATED : March 11, 1997
INVENTOR(S) : Shinji Tsuchiha It is certified that error appears in the above-identified patent and that said Letters Patent is hereby corrected as shown below:

Title page,
Item [56], References Cited, U.S. PATENT DOCUMENTS,
"4,800,439    1/1989    Yoshina" should read
-- 4,800,439    1/1989    Yoshino --.

Drawings,
Sheet 9, FIG. 4B, "CUPING" should read -- CODING --.

Column 4,
Line 9, "inputting. When" should read -- inputting, when --.

Column 8,
Line 10, "data" should read -- data is --.

Column 9,
Line 43, "oneself," should read -- himself or herself, --.
Line 48, "shows" should read -- show --.
Line 57, "an other" should read -- another --.

Column 12,
Line 11, "sire" should read -- wire --.

Column 15,
Lines 16 and 50, "mean," should read -- means; --.

Signed and Sealed this

Ninth Day of December, 2003

JAMES E. ROGAN
*Director of the United States Patent and Trademark Office*